(12) United States Patent
Iwaki

(10) Patent No.: US 6,519,112 B1
(45) Date of Patent: Feb. 11, 2003

(54) LIQUID DYNAMIC PRESSURE BEARING AND SPINDLE MOTOR, HARD-DISK DRIVING UNIT, AND SCANNER MOTOR USING THE BEARING

(75) Inventor: Tadao Iwaki, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/354,475

(22) Filed: Jul. 15, 1999

(30) Foreign Application Priority Data

Jul. 22, 1998 (JP) ............................................. 10-206395

(51) Int. Cl.[7] ............................................. G11B 17/02
(52) U.S. Cl. .................................................... 360/99.08
(58) Field of Search ............... 360/99.08; 384/107–113, 384/100, 130, 132

(56) References Cited

U.S. PATENT DOCUMENTS

| | | | | |
|---|---|---|---|---|
| 4,512,626 A | * | 4/1985 | Kamiya et al. .............. | 359/200 |
| 6,118,620 A | * | 9/2000 | Grantz et al. ............ | 360/99.08 |
| 6,126,320 A | * | 10/2000 | Ichiyama .................... | 384/112 |
| 6,176,618 B1 | * | 1/2001 | Kawawada et al. ......... | 384/107 |

FOREIGN PATENT DOCUMENTS

JP          5712828          1/1982

* cited by examiner

Primary Examiner—George J. Letscher
(74) Attorney, Agent, or Firm—Adams & Wilks

(57) ABSTRACT

A liquid dynamic pressure bearing has bearing portions provided at opposite ends of a rotor shaft. The bearing portions are spaced from the rotor shaft by a gap having only one opening portion to maintain lubrication oil therein. A capillary oil sealing portion is formed at the opening portion to prevent evaporation and leakage of oil. Inside the bearing portions, journal bearings are formed at the central axis of the rotor shaft to prevent precession of the rotor shaft. A driving mechanism for driving the rotor shaft and a load are formed between the bearing portions to provide a stable spindle motor resistant to external vibration.

68 Claims, 5 Drawing Sheets

LIQUID DYNAMIC PRESSURE BEARING AND SPINDLE MOTOR, HARD-DISK DRIVING UNIT, AND SCANNER MOTOR USING THE BEARING

BACKGROUND OF THE INVENTION

The present invention relates to a liquid dynamic pressure bearing and to a spindle motor, a hard-disk driving unit, and, a scanner motor using the bearing and constructed so that the bearing supports a load by means of liquid dynamic pressure of oil drawn by rotation in a groove formed at either or both of a rotating face and a static face.

A bearing construction in which a rotor shaft is supported by a liquid dynamic pressure bearing is well known and is used in various kinds of motors and the like. It has previously been attempted to realize stable rotation resistance to external shock by a construction supporting both ends of the liquid dynamic pressure bearing as disclosed in Japanese Laid-Opened Utility Model No. 57-12828, for example.

However, both ends of a liquid region for lubrication formed between the rotating face and the static face are left open if it is attempted to provide support with both ends of the bearing in the liquid dynamic pressure bearing. Therefore, liquid for lubrication has a problem in that sealing is not adequate and leakage of liquid occurs easily because only surface tension and viscosity of liquid must support the liquid in the predetermined region.

Moreover, the construction opened at both ends has problems in that the area where liquid for lubrication contacts air increases sharply, the speed of evaporation of the liquid for lubrication becomes high, and the condition of lubrication between the rotating face and the static face becomes insufficient.

An object of the present invention is to provide a liquid dynamic pressure bearing and a spindle motor, a hard disk driving unit, and a scanner motor supporting both ends of a rotor shaft stably by the liquid dynamic pressure bearing without the above-mentioned inconvenience.

SUMMARY OF THE INVENTION

To achieve the above-object, a liquid dynamic pressure bearing in a first aspect of the present invention has the characteristics that it is a liquid dynamic pressure bearing for supporting a rotor shaft; it has a pair of liquid dynamic pressure bearings for supporting both ends of the rotor shaft; the pair of liquid dynamic pressure bearings keep the predetermined liquid for lubrication in a clearance having only one opening portion; and a journal bearing is formed in a common axis at least at one side of one of the liquid dynamic pressure bearings.

The pair of liquid dynamic pressure bearings may be conical in shape at a bearing face thereof in a second aspect.

The pair of liquid dynamic pressure bearings may be disk shape at a bearing face thereof in a third aspect.

A capillary oil-sealing portion may be formed at the opening portion in a fourth aspect.

A liquid receiver for receiving liquid between an edge end of the journal bearing and the facing rotor shaft is provided in a fifth aspect.

A spindle motor supporting the rotor by liquid dynamic pressure bearing of the present invention is characterized by the following characteristics: the spindle motor has a pair of liquid dynamic pressure bearing portions with which the liquid dynamic pressure bearings support both ends of the rotor shaft; the pair of liquid dynamic pressure bearing portions keep the predetermined liquid for lubrication with clearance having only one opening portion; and a journal bearing is formed in common axis at least at one side at the one liquid dynamic pressure bearing portion in a sixth aspect.

The pair of liquid dynamic pressure bearing portions may be conical in shape at the bearing face thereof in a seventh aspect.

The pair of liquid dynamic pressure bearing portions may be disk shaped at the bearing face thereof in an eighth aspect.

A capillary oil-sealing portion may be formed at the opening portion in a ninth aspect.

A liquid receiver for receiving the liquid between an edge end of the journal bearing and the facing rotor shaft is provided in a tenth aspect.

A rotating driving source and a load of the spindle motor may be arranged between the pair of liquid dynamic pressure bearings in an eleventh aspect.

The load may be surrounded with a cover in a twelfth aspect.

A hard disk driving unit attaching magnetic disk media at a rotor: shaft supported by liquid dynamic pressure bearings according to the present invention is characterized by the following: the driving unit has a pair of liquid dynamic pressure bearing portions which the liquid dynamic pressure bearings support each both ends of the rotor shaft; the pair of liquid dynamic pressure bearing portions keep the predetermined liquid for lubrication with clearance having only one opening portion; and a journal bearing is formed in common axis at least at one side at the one liquid dynamic pressure bearing portion in a thirteenth aspect.

The pair of liquid dynamic pressure bearing portions may be conical in shape at the bearing face thereof in a fourteenth aspect.

The pair of liquid dynamic pressure bearing portions may be disk shaped at the bearing face thereof in a fifteenth aspect.

A capillary oil-sealing portion may be formed at the opening portion in a sixteenth aspect.

A liquid receiver for receiving liquid between edge end of the journal bearing and the facing rotor shaft is provided in a seventeenth aspect.

A driving source for rotating the rotor shaft and magnetic disk media may be arranged between the pair of liquid dynamic pressure bearings in an eighteenth aspect.

The magnetic disk media may be surrounded with a cover in a nineteenth aspect.

Between the liquid dynamic pressure bearing portion and the magnetic disk media, a projected trap for shorten air clearance of border of them may be formed in a twentieth aspect.

A scanner motor attaching a rotating polygon mirror at a rotor shaft supported by liquid dynamic pressure bearings of the present invention is characterized by the following: the scanner motor has a pair of liquid dynamic pressure bearing portions which the liquid dynamic pressure bearings support each of both ends of the rotor shaft; the pair of liquid dynamic pressure bearing portions keep the predetermined liquid for lubrication with clearance having only one opening portion; and a journal bearing is formed in common at least one side at the one liquid dynamic pressure bearing portion in a twenty-first aspect.

The pair of liquid dynamic pressure bearing portions may be conical in shape at the bearing face thereof in a twenty-second aspect.

The pair of liquid dynamic pressure bearing portions may be disk shaped at the bearing face thereof in a twenty-third aspect.

A capillary oil-sealing portion may be formed at the opening portion in a twenty-fourth aspect.

A liquid receiver for receiving the liquid between edge end of the journal bearing and the facing rotor shaft is provided in a twenty-fifth aspect.

A driving source for rotating the rotor shaft arid a rotating polygon mirror may be arranged between the pair of liquid dynamic pressure bearings in a twenty-sixth aspect.

The rotating polygon mirror may be surrounded with a cover in a twenty-seventh aspect.

Between the liquid dynamic pressure bearing portion and the magnetic disk media, a projected trap for shortening air clearance an a border therebetween may be formed in a twenty-eighth aspect.

The liquid dynamic pressure bearings of the present invention keep lubrication oil for generating dynamic pressure with clearance and having only one opening portion. That can keep lubrication oil inside of the bearing so that leakage of lubrication oil is suppressed.

In the spindle motor of the present invention, both ends of the rotor shaft are supported by the liquid dynamic pressure bearings, and between the pair of liquid dynamic pressure bearings, the rotating driving source and the load are formed near the center of gravity of the bearing at the rotor shaft. Therefore, the spindle motor is resistant to external shock.

In the hard disk driving unit of the present invention, the magnetic disk media formed at the rotor shaft of the spindle motor as a load so as to prevent precession of the rotor. Therefore, rotation of the magnetic disk media can be stabilized.

In the scanner motor of the present invention, the rotating polygon mirror is formed at the rotor shaft of the spindle motor as a load so as to prevent precession of the rotor. Therefore, scanning of the rotating polygon mirror can be performed accurately without fluctuation.

DETAILED DESCRIPTION OF THE PRESENT INVENTION

Referring to the attached figures, examples of embodiments of the present invention will be described below in detail.

Figure 1:
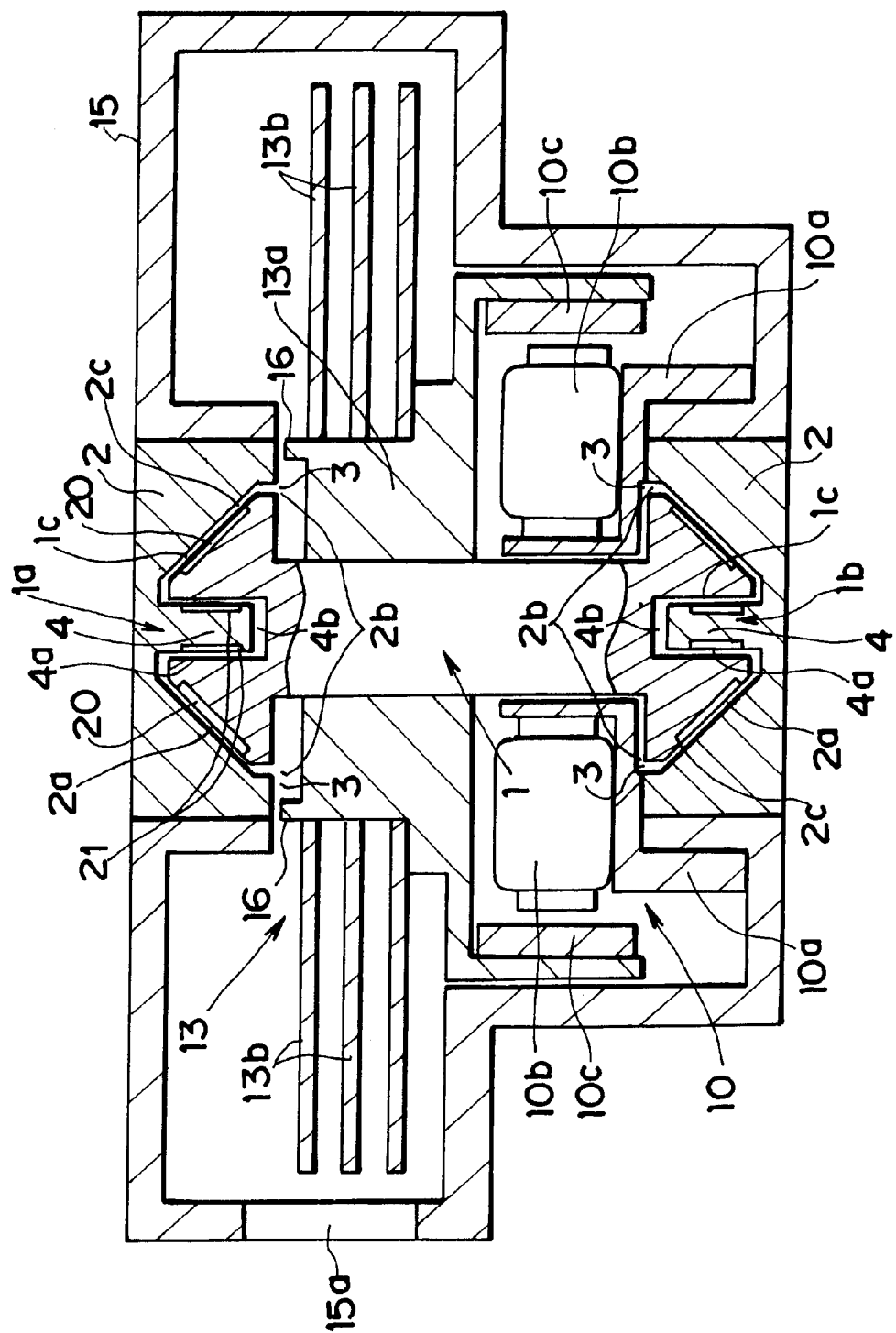
FIG. 1 is a sectional side view showing a first embodiment of a hard disk driving unit having the liquid dynamic pressure bearings of the present invention.

FIG. 1 is a view showing a first embodiment of a liquid dynamic pressure bearing of the present invention. In the figure, a sectional side view of a hard disk drive unit using the liquid dynamic pressure bearing is shown.

Liquid dynamic pressure bearing portions 2 are formed at both ends of rotor shaft 1 to support rotation of the rotor shaft 1. In these liquid dynamic pressure bearings 2, bearing faces 2a are formed in a conical shape, and both end portions 1a and 1b of the rotor shaft 1 formed in a conical shape are supported. Namely, the bearing faces 2a are formed at a predetermined angle as shown in FIG. 1. Lubrication liquid (lubrication oil) of the rotor shaft 1 is kept each in these liquid dynamic pressure bearings.

That is, each of these dynamic pressure bearings 2 keeps the lubrication oil in a clearance 2c having only one opening portion 2b exposed to outside air so as to prevent leakage of the lubrication oil from the inside.

Capillary oil-sealing portions 3 are formed at the opening portions 2b so as to prevent leakage of liquid around the opening portions 2b and evaporation.

In each of the liquid dynamic pressure bearings 2, a journal bearing 4 is formed in common with the rotation center of the rotor shaft 1. Bearing faces 4a of the journal bearings 4 support concave grooves 1c formed at the rotor shaft 1, and at the bottom portions of the journal bearings 4, liquid receivers 4b are formed so as to keep the predetermined quantity of the lubrication oil.

The journal bearings 4 are formed in one body as portions of the liquid dynamic pressure portions 2 as shown in FIG. 1. The journal bearings 4 may be formed only at one end of the rotor. The journal bearings 4 are useful to prevent the rotor shaft 1 from undergoing precession. As the journal bearings 4 are formed, it is possible to provide a supply of lubrication liquid for a long time from the liquid receiver 4b if the lubrication liquid from the opening portion 2b evaporates.

At the rotor shaft 1, a rotation driving source 10 and a load 13 are arranged between a pair of the liquid dynamic pressure bearings 2 so as to constitute a spindle motor. That can keep ensure stable rotation of the rotor shaft 1.

In the driving source 10, a motor coil 10b is formed at a fixed coil base 10a, and the motor coil 10b is arranged at the outer circumference of the rotor shaft 1.

A disk-supporting member 13a is fixed at the rotor shaft 1, and at the disk-supporting member 13a, a permanent magnet 10c is formed at a position facing the motor coil 10b.

The above construction makes the rotor shaft 1 forming the permanent magnet 10c rotate by letting current flow to the motor coil 10b. The liquid dynamic pressure bearing portion 2 forms a lubrication liquid layer of high pressure in the clearance 2c at steady rotation so as to realize non-contacting rotation in the liquid dynamic pressure bearing portion.

A stator has a cover 15 described later. The driving source is a brush-less type, and is controlled based on a driving power supply using a rectifying circuit and a smoothing circuit not shown. As the rotation driving source 10 and the load 13 are arranged between a pair of liquid dynamic pressure bearing portions 2, rotation is stabilized without deflection of the shaft.

The load 13 in the embodiment comprises the disk-supporting member 13a and plural magnetic disk media 13b. All of the magnetic disk media 13b are surrounded with the cover 15 so as to reduce windage loss during rotation.

A trap 16 having a predetermined height is projected all around the disk-supporting member 13a having a short clearance between the bearing portion 2 and the magnetic disk media 13b, and the trap 16 divides into spaces of said liquid dynamic pressure bearing portion 2 and the magnetic disk media 13b.

The division prevents the liquid from attaching at the magnetic disk media 13b even if liquid (lubrication oil) evaporates from the opening portion 2b of the liquid dynamic pressure bearing portion 2. Although the trap 16 is formed at the disk-supporting member 13a side in the figure, the trap 16 may be projected from the liquid dynamic pressure bearing portion 2.

In the cover 15, a head inserting opening 15a is formed at a side portion of the magnetic disk media 13b so that a predetermined number of heads (not shown) may be inserted from the head inserting opening 15a so as to face the disk media 13b.

Figure 5:
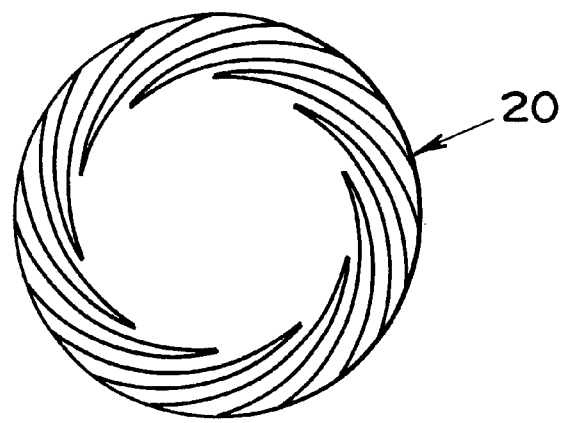
FIG. 5 is a view showing bearing face of a liquid dynamic pressure bearing portion.
Figure 6:
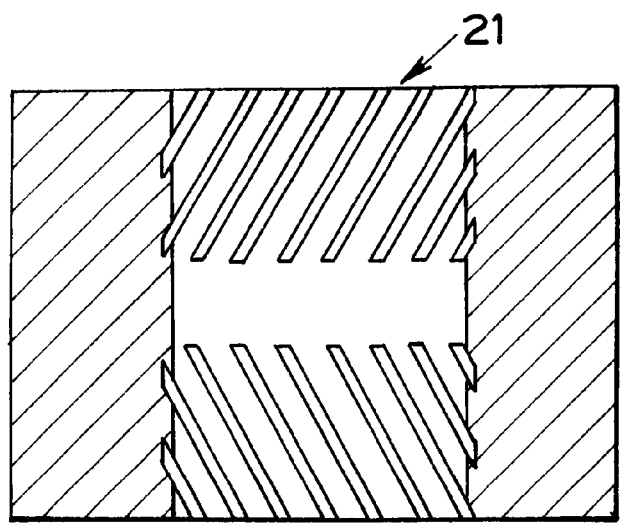
FIG. 6 is a sectional view showing bearing face of a journal bearing.

Spiral grooves 20 shown in FIG. 5 are formed at the bearing face 2a of the above-mentioned liquid dynamic pressure bearing 2. Herringbone grooves 21 shown in FIG. 6 are formed at the bearing face 4a of the journal bearing. Forming the spiral grooves 20 and the herringbone grooves 21 can generate dynamic pressure by lubrication oil.

The liquid dynamic pressure bearing portion 2 having the above-mentioned construction has a conical bearing, and dynamic pressure is divided equally into both of horizontal and vertical directions if the bearing face 2a has an angle of 45 degrees as shown in FIG. 1 for example. Therefore, the liquid dynamic pressure bearing portion 4 can restrict deflection to the direction if component of force of the horizontal direction is applied to the rotor shaft 1 by the liquid dynamic pressure bearing portion 2. Force for reducing precession of the rotor shaft 1 to a minimum can be applied with dynamic pressure in the horizontal direction caused by the herringbone grooves 21 formed at the journal bearing 4.

The rotation driving source 10 and the load 13 are arranged between a pair of liquid dynamic pressure bearing portions 2. Lubrication oil for generating dynamic pressure is kept with a clearance 2c having only one opening 2b, and at the opening portion 2b, a capillary oil sealing portion 3 is formed. These decrease the area of liquid contacting air, decrease leakage and evaporation of lubrication oil, and can keep rotating performance of the rotor shaft 1 stable for a long time so as to lengthen the life of motor. Needless to say, the rotor shaft 1 can rotate in a non-contacting state at high speed by the lubrication oil formed between dynamic pressure bearing portion 2.

As the load 13 is arranged near the center of gravity of the rotor shaft 1, a motor resisting external shock can be provided. As the rotor shaft 1 can rotate stably without precession, reading out and writing can be carried out stably without deflection of the magnetic disk media 13b so as to lengthen the life of the unit.

Figure 2:
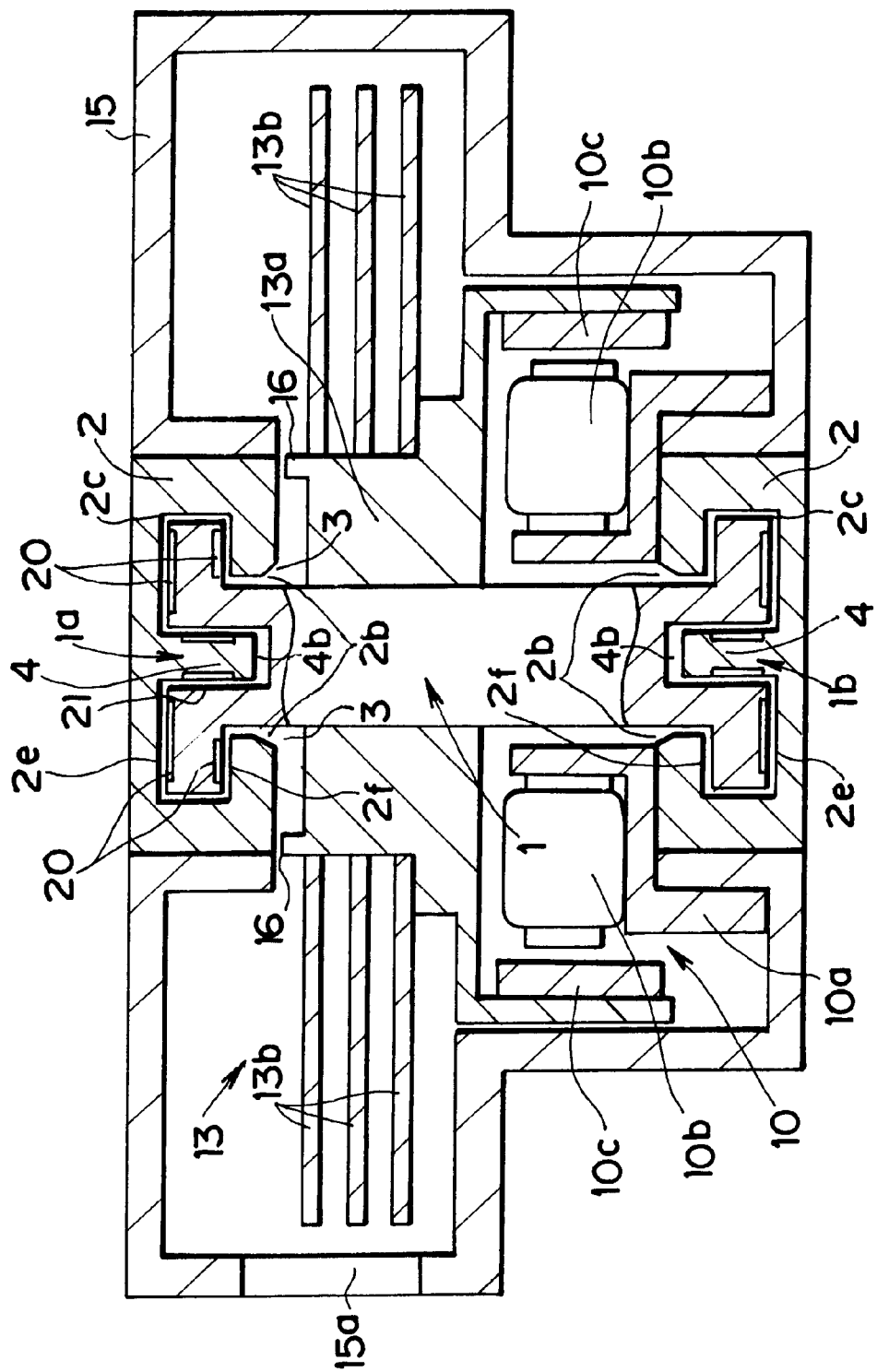
FIG. 2 is a sectional side view showing a second embodiment of the present invention.

Next, FIG. 2 is a view showing a second embodiment of the liquid dynamic pressure bearing of the present invention. The liquid dynamic pressure bearing portion 2 according to the second embodiment is a flat plate shape structure. Bearing faces 2e and 2f are cylindrical thrust bearings arranged facing a perpendicular direction with respect to the axis of the rotor shaft 1. Both end portions of the corresponding rotor shaft 1 are formed in a cylindrical shape perpendicular to the direction of the axis of the rotor shaft 1 so as to face to the bearing faces 2e and 2f.

The embodiment shown in FIG. 2 is similar to the first embodiment. The liquid dynamic pressure bearing portion 2 of the second embodiment provides support in the axial direction of the rotor shaft 1, and the journal bearing 4 provides support in the horizontal direction.

In the embodiment, spiral grooves 20 shown in FIG. 5 are formed at bearing faces 2e and 2f of horizontal plane shape.

In the above-mentioned constitution too, the rotation driving source 10 and the load 13 are arranged between a pair of liquid dynamic pressure bearing portions 2 similarly to the first embodiment. Lubrication oil for generating dynamic pressure is kept with clearance 2c having only one opening 2b, and at the opening portion 2b, the capillary oil-sealing portion 3 is formed. These can prevent leakage and evaporation of lubrication oil, and can decrease the phenomenon. Moreover, life of the motor can be lengthened.

As the load 13 is arranged near the center of gravity of the rotor shaft 1, a motor resisting to shock from exterior can be constituted.

Figure 3:
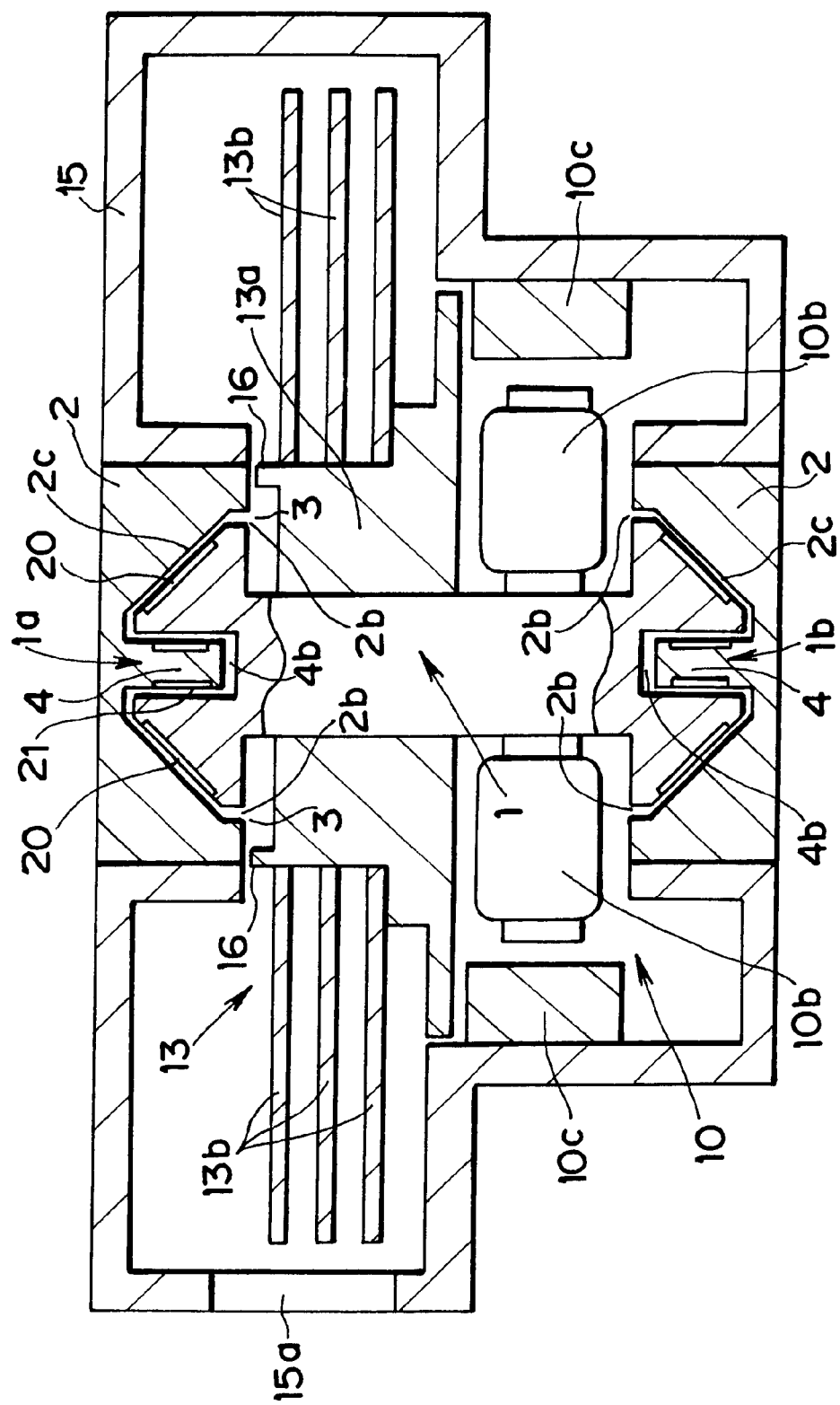
FIG. 3 is a sectional side view showing a third embodiment of the present invention.

Next, FIG. 3 is a view showing a third embodiment of the present invention.

In the third embodiment, constitution of the rotation driving portion 10 of the first embodiment is changed. A motor coil 10b is fixed at the rotor shaft 1. A permanent magnet 10c is formed at a cover (stator) of the fixed side. Even in such the constitution, the rotor shaft 1 can be rotation-driven similarly to the first embodiment.

Figure 4:
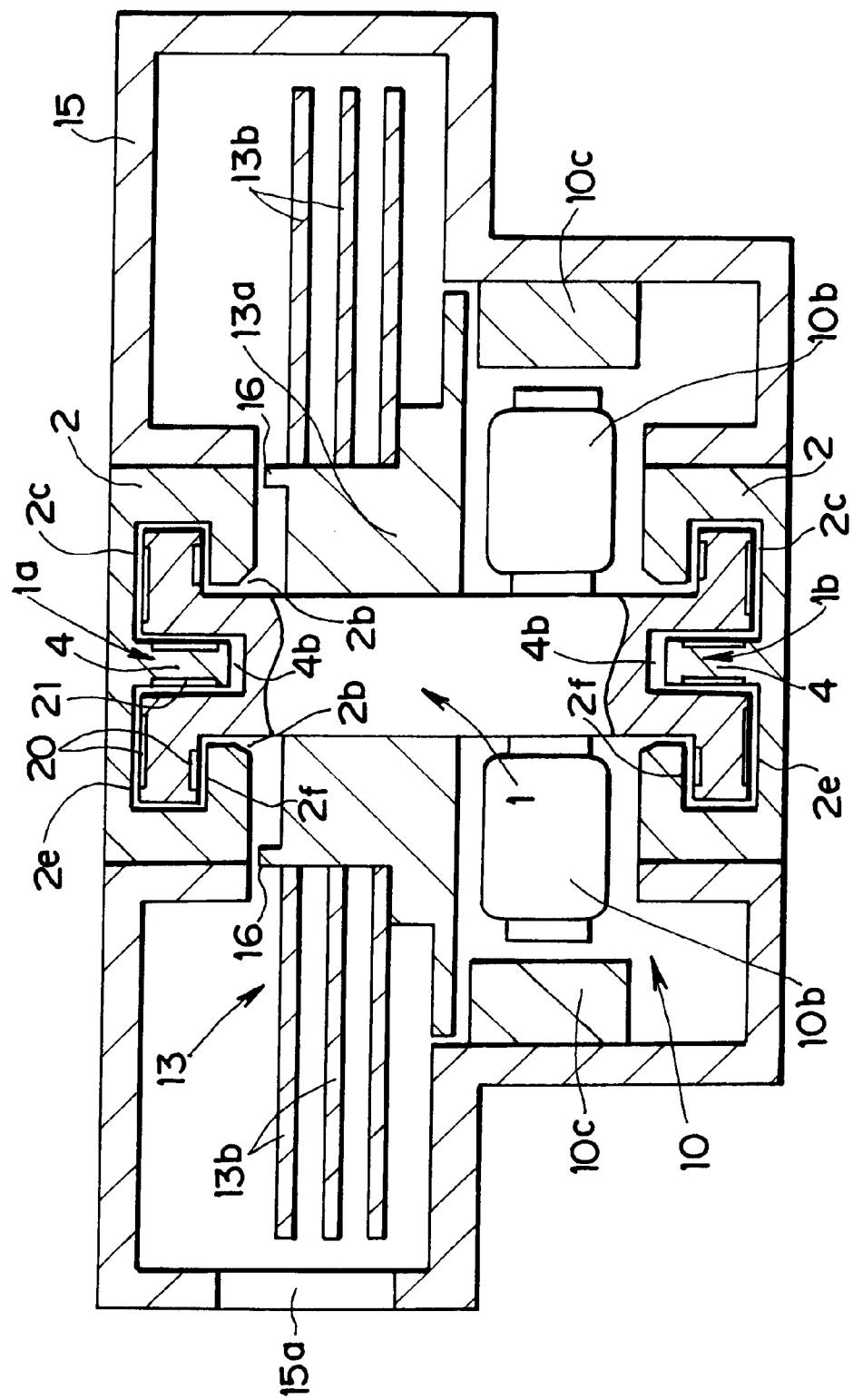
FIG. 4 is a sectional side view showing a fourth embodiment of the present invention.

Moreover, FIG. 4 is a view showing a fourth embodiment of the present invention.

In the fourth embodiment, constitution of the rotation driving portion 10 of the second embodiment is changed. A motor coil 10b is fixed at the rotor shaft 1. A permanent magnet 10c is formed at a cover (stator) of the fixed side. Even in such the constitution, the rotor shaft 1 can be driven similarly to the second embodiment.

In the constitutions changing the rotation driving portion 10 like the third and fourth embodiments too, the rotation driving source 10 and the load 13 are arranged between a pair of liquid dynamic pressure bearing portions 2. Lubrication oil for generating dynamic pressure is kept with clearance 2c having only one opening 2b, and at the opening portion 2b, the capillary oil-sealing portion 3 is formed. These can remove leakage of lubrication oil, and can decrease the phenomenon. Moreover, rotation life of the rotor shaft 1 can be lengthened so as to lengthen life of the motor.

In each of the above-mentioned embodiments, an example in which a spindle motor having liquid dynamic pressure bearings is used for a hard disk driving unit is described. Such the spindle motor can be used for a scanner motor except the above-mentioned. In the scanner motor a rotation polygon mirror member is attached at the rotor shaft supported by the liquid dynamic pressure bearings. In the polygon mirror, plural plane mirrors are attached at the rotor shaft 1 at an interval of the predetermined angle.

Reflected angle of the rotation polygon mirror is changed continuously depending on rotation of the rotor shaft 1 so that the predetermined scanning is possible. In the scanner motor, rotation polygon mirror is arranged between a pair of liquid dynamic pressure bearing portions 2 as the load 13 described in the above-mentioned embodiment. That can rotate stably without precession of the rotor shaft 1 so as to scan accurately.

The liquid dynamic pressure bearings of the present invention are formed at the both ends of the rotor shaft and keep liquid for lubrication with clearance having only one opening portion. That can support the rotor shaft at both ends thereof, and moreover can make area where liquid for lubrication contacts with air narrow so as to prevent the liquid from evaporating and leaking and to keep the liquid at inside of the bearing. At inside of the liquid dynamic pressure bearing, at least one journal bearing is formed continuously in common axis so as to prevent usefully precession of the rotor shaft.

The pair of liquid dynamic pressure bearing portions can form the bearing face in conical shape or disk shape. Forming the capillary oil-sealing portion at said opening portion can prevent leakage of liquid further. Forming the liquid receiver for receiving said liquid between edge of said journal bearing and facing rotor shaft can receive the predetermined quantity of said liquid at inside of the liquid dynamic pressure bearing.

The spindle motor of the present invention has a constitution in which both end portions of the rotor shaft are supported with said liquid dynamic pressure bearings. The rotation-driving source and load are formed near the center of gravity of the bearing at the rotor between the pair of liquid dynamic pressure bearings. That can constitute the motor resisting shock from exterior adding to the advantage of said liquid dynamic pressure bearing. Surrounding the load with a cover can decrease windage loss at load rotation.

The hard disk driving unit of the present invention has a constitution in which magnetic disk media are formed at the rotor shaft of said spindle motor for the load. That can stabilize rotation of the magnetic disk media by prevention of precession of the rotor shaft adding to the advantage of said liquid dynamic pressure bearing and said spindle motor. That improves durability of reading out and writing of the magnetic disk media so as to lengthen life of the unit.

The scanner motor of the present invention has a constitution in which a rotation polygon mirror is formed at the rotor shaft of said spindle motor for load. That can carry out correctly scanning of the rotation polygon mirror without fluctuation by prevention of precession of the rotor shaft adding to the advantage of said liquid dynamic pressure bearing and said spindle motor.

A constitution having a trap can prevent liquid from attaching at said magnetic disk media and said rotation polygon mirror performing as the load so as to prevent decrease of performance of the unit even if the liquid leaks from the liquid dynamic pressure bearing because of evaporation for example.

Windage loss caused by rotation of the load can decreased by surrounding said magnetic disk media and said rotation polygon mirror performing as the load with a cover so as to rotate the load stably.

What is claimed is:

1. A liquid dynamic pressure bearing for supporting a rotor shaft, comprising:
   a pair of liquid dynamic pressure bearing portions disposable at opposite axial ends of a rotor shaft, each bearing portion having a bearing face for supporting a respective end of the rotor shaft with a gap defined between each of the bearing faces and the rotor shaft for maintaining therein a liquid used for lubrication, the gap having only one opening portion exposed to outside air; and
   a journal bearing disposable at a central axis of the rotor shaft at least at one side of the rotor shaft and defined by the rotor shaft and one of the liquid dynamic pressure bearing portions.

2. A liquid dynamic pressure bearing according to claim 1; wherein the bearing faces of the liquid dynamic pressure bearing portions are conical in shape.

3. A liquid dynamic pressure bearing according to claim 2; wherein the ends of the rotor shaft are conical in shape.

4. A liquid dynamic pressure bearing according to claim 3; wherein pressure generating grooves are formed in a bearing surface comprising at least one of a bearing face and an end of the rotor shaft.

5. A liquid dynamic pressure bearing according to claim 1; wherein the bearing faces of the liquid dynamic pressure bearing portions are disk shaded.

6. A liquid dynamic pressure bearing according to claim 5; wherein the ends of the rotor shaft have disk-shaped portions mating With the bearing faces of the liquid dynamic pressure bearing portions.

7. A liquid dynamic pressure bearing according to claim 1; further comprising a capillary oil-sealing portion formed at the opening portion.

8. A liquid dynamic pressure bearing according to claim 1; further comprising a liquid reservoir for receiving the liquid formed at the journal bearing.

9. A liquid dynamic pressure bearing according to claim 8; wherein the journal bearing comprises a journal extending from at least one of the liquid dynamic pressure bearing portions and a slot formed in the rotor shaft into which the journal extends, with a gap defined between the journal and the slot, and the liquid reservoir comprises a portion of the gap.

10. A liquid dynamic pressure bearing according to claim 1; wherein the journal bearing comprises a journal extending from at least one of the liquid dynamic pressure bearing portions and a slot formed in the rotor shaft into which the journal extends, with a gap defined between the journal and the slot.

11. A liquid dynamic pressure bearing according to claim 1; wherein pressure generating grooves are formed in a bearing surface comprising at least one of a bearing face and an end of the rotor shaft.

12. A liquid dynamic pressure bearing according to claim 1; wherein the opening portion of the gap faces an axial center of the rotor shaft.

13. A spindle motor for supporting a rotor shaft with liquid dynamic pressure bearings, comprising:
    a rotor shaft disposed to undergo rotational movement;
    a pair of liquid dynamic pressure bearing portions disposed at opposite axial ends of the rotor shaft, each bearing portion having a bearing face for supporting a respective end of the rotor shaft with a gap defined between each of the bearing faces and the rotor shaft for maintaining therein a liquid used for lubrication, the gap having only one opening portion exposed to outside air; and
    a journal bearing formed at a central axis of the rotor shaft at least at one side of the rotor shaft and defined by the rotor shaft and one of the liquid dynamic pressure bearing portions.

14. A spindle motor according to claim 13; wherein the bearing faces of the liquid dynamic pressure bearing portions are conical in shape.

15. A spindle motor according to claim 14; wherein the ends of the rotor shaft are conical in shape.

16. A spindle motor according to claim 15; wherein pressure generating grooves are formed in a bearing surface comprising at least one of a bearing face and an end of the rotor shaft.

17. A spindle motor according to claim 13; wherein the bearing faces of the liquid dynamic pressure bearing portions are disk shaped.

18. A spindle motor according to claim 17; wherein the ends of the rotor shaft have disk-shaped portions mating with the bearing faces of the liquid dynamic pressure bearing portions.

19. A spindle motor according to claim 13; further comprising a capillary oil-sealing portion formed at the opening portion.

20. A spindle motor according to claim 13; further comprising a liquid reservoir for receiving the liquid formed at the journal bearing.

21. A spindle motor according to claim 20; wherein the journal bearing comprises a journal extending from at least one of the liquid dynamic pressure bearing portions and a slot formed in the rotor shaft into which the journal extends, with a gap defined between the journal and the slot, and the liquid reservoir comprises a portion of the gap.

22. A spindle motor according to claim 13; further comprising a driving source for rotationally driving the rotor shaft, and a load driven by the rotor shaft of the spindle motor, each being arranged between the pair of liquid dynamic pressure bearing portions.

23. A spindle motor according to claim 22; further comprising a trap for restricting a space between the dynamic pressure bearing portion and the load, the trap comprising a projection extending from one of the dynamic pressure bearing portions and the load.

24. A spindle motor according to claim 22; further comprising a cover for surrounding the load.

25. A spindle motor according to claim 13; wherein the journal bearing comprises a journal extending from at least one of the liquid dynamic pressure bearing portions and a slot formed in the rotor shaft into which the journal extends, with a gap defined between the journal and the slot.

26. A spindle motor according to claim 13; wherein pressure generating grooves are formed in a bearing surface comprising at least one of a bearing face and an end of the rotor shaft.

27. A spindle motor according to claim 13; wherein the opening portion of the gap faces an axial center of the rotor shaft.

28. A hard disk drive unit comprising:
a rotor shaft disposed to undergo rotational movement;
a magnetic disk media attached to the rotor shaft to undergo rotation therewith;
a pair of liquid dynamic pressure bearing portions disposed at opposite axial ends of the rotor shaft, each bearing portion having a bearing face for supporting a respective end of the rotor shaft with a gap defined between each of the bearing faces and the rotor shaft for maintaining therein a liquid used for lubrication, the gap having only one opening portion exposed to outside air; and
a journal bearing formed at a central axis of the rotor shaft at least at one side of one of the rotor shaft and defined by the rotor shaft and one of the liquid dynamic pressure bearing portions.

29. A hard disk drive unit according to claim 28; wherein the bearing faces of the liquid dynamic pressure bearing portions are conical in shape.

30. A hard disk drive unit liquid dynamic pressure bearing according to claim 29; wherein the ends of the rotor shaft are conical in shape.

31. A hard disk drive unit according to claim 30; wherein pressure generating grooves are formed in a bearing surface comprising at least one of a bearing face and an end of the rotor shaft.

32. A hard disk drive unit according to claim 28; wherein the bearing faces of the liquid dynamic pressure bearing portions are disk shaped.

33. A hard disk drive unit according to claim 32; wherein the ends of the rotor shaft have disk-shaped portions mating with the bearing faces of the liquid dynamic pressure bearing portions.

34. A hard disk drive unit according to claim 28; further comprising a capillary oil-sealing portion formed at the opening portion.

35. A hard disk drive unit according to claim 28; further comprising a liquid reservoir for receiving the liquid formed at the journal bearing.

36. A hard disk drive unit according to claim 35; wherein the journal bearing comprises a journal extending from at least one of the liquid dynamic pressure bearing portions and a slot formed in the rotor shaft into which the journal extends, with a gap defined between the journal and the slot, and the liquid reservoir comprises a portion of the gap.

37. A hard disk drive unit according to claim 28; further comprising a driving source for rotationally driving the rotor shaft, wherein the driving source and the magnetic disk media are arranged between the pair of liquid dynamic pressure bearing portions.

38. A hard disk drive unit according to claim 28; further comprising a cover for surrounding the magnetic disk media.

39. A hard disk drive unit according to claim 28; further comprising a trap for restricting a space between a dynamic pressure bearing portion and the magnetic disk media, the trap comprising a projection extending from one of the liquid dynamic pressure bearing portions and the magnetic disk media.

40. A hard disk drive unit according to claim 28; wherein the journal bearing comprises a journal extending from at least one of the liquid dynamic pressure bearing portions and a slot formed in the rotor shaft into which the journal extends, with a gap defined between the journal and the slot.

41. A hard disk drive unit according to claim 28; wherein pressure generating grooves are formed in a bearing surface comprising at least one of a bearing face and an end of the rotor shaft.

42. A hard disk drive unit according to claim 28; wherein the opening portion of the gap faces an axial center of the rotor shaft.

43. A scanner motor comprising:
a rotor shaft disposed to undergo rotational movement;
a polygon mirror attached to the rotor shaft to undergo rotation therewith;
a pair of liquid dynamic pressure bearing portions disposed at opposite axial ends of the rotor shaft, each bearing portion having a bearing face for supporting a respective end of the rotor shaft, with a gap defined between each of the bearing faces and the rotor shaft for maintaining therein a liquid used for lubrication, the gap having only one opening portion exposed to outside air; and
a journal bearing formed at a central axis of the rotor shaft at least at one side of the rotor shaft and defined by the rotor shaft and one of the liquid dynamic pressure bearing portions.

44. A scanner motor according to claim 43; wherein the bearing faces of the liquid dynamic pressure bearing portions are conical in shape.

45. A scanner motor according to claim 44; wherein the ends of the rotor shaft are conical in shape.

46. A scanner motor according to claim 45; wherein pressure generating grooves are formed in a bearing surface comprising at least one of a bearing face and an end of the rotor shaft.

47. A scanner motor according to claim 43; wherein the bearing faces of the liquid dynamic pressure bearing portions are disk shaped.

48. A scanner motor according to claim 47; wherein the ends of the rotor shaft have disk-shaped portions mating with the bearing faces of the liquid dynamic pressure bearing portions.

49. A scanner motor according to claim 43; further comprising a capillary oil-sealing portion formed at the opening portion.

50. A scanner motor according to claim 43; further comprising a liquid reservoir for receiving the liquid formed at the journal bearing.

51. A scanner motor according to claim 50; wherein the journal bearing comprises a journal extending from at least one of the liquid dynamic pressure bearing portions and a slot formed in the rotor shaft into which the journal extends, with a gap defined between the journal and the slot; and wherein the liquid reservoir comprises a portion of the gap.

52. A scanner motor according to claim 43; further comprising a driving source for rotationally driving the rotor shaft wherein the rotating polygon mirror and the driving source are arranged between the pair of liquid dynamic pressure bearing portions.

53. A scanner motor according to claim 43; further comprising a cover for surrounding the rotating polygon mirror.

54. A scanner motor according to claim 43; further comprising a trap for restricting a space between a dynamic pressure bearing portion and the rotating polygon mirror side, the trap comprising a projection extending from one of the liquid dynamic pressure bearing portions and the rotating polygon mirror.

55. A scanner motor according to claim 54; wherein the trap comprises a projection extending from one of the respective bearing portions and the rotating polygon mirror and extending substantially around the circumference thereof to restrict a space between the respective bearing portion and the polygon mirror.

56. A scanner motor according to claim 43; wherein the journal bearing comprises a journal extending from at least one of the liquid dynamic pressure bearing portions and a slot formed in the rotor shaft into which the journal extends, with a gap defined between the journal and the slot.

57. A scanner motor according to claim 43; wherein pressure generating grooves are formed in a bearing surface comprising at least one of a bearing face and an end of the rotor shaft.

58. A scanner motor according to claim 43; wherein the opening portion of the gap faces an axial center of the rotor shaft.

59. A liquid dynamic pressure bearing device comprising: a rotary member mounted to undergo rotation; and a dynamic pressure bearing rotatably supporting the rotary member, the dynamic pressure bearing having a bearing member disposed adjacent to at least one end of the rotary member and being spaced therefrom by a gap in which a lubricating liquid is maintained, the bearing member having a first bearing surface for supporting the rotary member in an axial direction thereof and a second bearing surface for supporting the rotary member in a radial direction thereof; wherein only one opening exposed to outside air is provided in the gap defined between the rotary member and the bearing member.

60. A liquid dynamic pressure bearing device according to claim 59; wherein the rotary member comprises a rotor shaft having at least one end provided with a conical shape, the first bearing surface has a conical shape matching that of the end of the rotor shaft, and the second bearing surface comprises a journal extending from one of the rotor shaft and the bearing member and a slot formed in the other of the rotor shaft and the bearing member into which the journal extends, with a gap defined between the bearing member and the rotor shaft.

61. A liquid dynamic pressure bearing device according to claim 60; further comprising a liquid reservoir for receiving the liquid formed in the gap defined by the second bearing surface.

62. A liquid dynamic pressure bearing device according to claim 59; wherein the rotary member comprises a rotor shaft having at least one end provided with a disk shape, the first bearing surface has a shape matching that of the end of the rotor shaft, and the second bearing surface comprises a journal extending from one of the rotor shaft and the bearing member and a slot formed in the other of the rotor shaft and the bearing member into which the journal extends, with a gap defined between the bearing member and the rotor shaft.

63. A liquid dynamic pressure bearing device according to claim 59; wherein a bearing member is formed at opposite ends of the rotary member.

64. A liquid dynamic pressure bearing device according to claim 59; further comprising a capillary oil-sealing portion formed at the opening.

65. A spindle motor having a liquid dynamic pressure bearing device according to claim 59, wherein the rotary member comprises a rotor shaft of the spindle motor.

66. A hard disk drive unit having a liquid dynamic pressure bearing device according to claim 59, wherein the rotary member comprises a rotor shaft of the hard disk drive unit.

67. A scanner motor having a liquid dynamic pressure bearing device according to claim 59, wherein the rotary member comprises a rotor shaft of the scanner motor.

68. A liquid dynamic pressure bearing device according to claim 59; wherein the one opening provided in the gap faces an axial center of the rotary member.

* * * * *